United States Patent [19]

De Bie et al.

[11] Patent Number: 5,122,657
[45] Date of Patent: Jun. 16, 1992

[54] ANTI-REFLECTION ARRANGEMENT FOR OPTICAL DOCUMENT SCANNER

[75] Inventors: Johannes H. De Bie; Leopold C. M. Beirens, both of Eindhoven, Netherlands

[73] Assignee: U.S. Philips Corp., New York, N.Y.

[21] Appl. No.: 581,827

[22] Filed: Sep. 12, 1990

[30] Foreign Application Priority Data

Sep. 14, 1990 [NL] Netherlands .................. 8902295

[51] Int. Cl.⁵ .............................................. H01J 5/16
[52] U.S. Cl. ............................ 250/227.20; 385/116
[58] Field of Search ............. 250/227.20, 227.11; 350/96.24, 96.25; 358/200, 901; 385/115, 116, 119, 146, 85

[56] References Cited

U.S. PATENT DOCUMENTS

| | | | |
|---|---|---|---|
| 4,153,333 | 5/1979 | Harada et al. | 350/96.25 |
| 4,564,760 | 1/1986 | Noguchi et al. | 250/484.1 |
| 4,570,063 | 2/1986 | De Bie et al. | 250/227.28 |
| 4,591,714 | 5/1986 | Goto et al. | 250/227.2 |
| 4,591,715 | 5/1986 | Goto | 250/227.2 |
| 4,776,667 | 10/1988 | Yoshida et al. | 350/96.25 |
| 4,824,194 | 4/1989 | Karasawa | 350/96.24 |

Primary Examiner—David C. Nelms
Assistant Examiner—S. Allen
Attorney, Agent, or Firm—William L. Botjer

[57] ABSTRACT

The device is provided with an optical fiber bundle (5) having a first linear end face (9) at the document side and a second end face (11) whose shape is adapted to the shape of the detection system (3).

To reduce the quantity of disturbing light from the light source (43; 61, 62; 44), which may reach the detection system (3), to a maximum possible extent, and to increase the quantity of signal light from the document (1), the second end face (11) is provided with an optical system (13, 14; 50; 70) for an improved coupling in and for reflections. The first end face (9) may also be provided with an optical system (16, 17) for reducing unwanted reflections.

20 Claims, 3 Drawing Sheets

ANTI-REFLECTION ARRANGEMENT FOR OPTICAL DOCUMENT SCANNER

BACKGROUND OF THE INVENTION

1. Field of the Invention

The invention relates to a device for optically scanning a document, which device comprises a light source for illuminating the document to be scanned, an optical detection system and an optical fiber bundle for transmitting light from the light source to the document and for transmitting light from the document to the detection system, said fiber bundle comprising a plurality of optical fibers having a core and a cladding and each having a first and a second end, said first ends being arranged substantially along a line in a first end face of the fiber bundle and the second ends being arranged in a second end face, the second end face facing the light source and the detection system.

2. Description of the Related Art

A device of the type referred to above is used, for example, in a facsimile apparatus with which picture material can be transmitted electronically. Such a scanning device can also be used for storing copies of documents in electronic filing systems such as magnetic or optical memories and for processing text or picture documents by means of a computer.

A device as described in the opening paragraph is known from U.S. Pat. No. 4,570,063. In the device described in this patent the radiation beam generated by the light source is obliquely incident on the second end face of the fiber bundle. This results in a large part of the light incident on the second end face being reflected. A small part of the reflected light subsequently reaches the light-sensitive surface of the detection system directly, or after reflection on other parts of the scanning device. Of the light which is passed through the fiber bundle in the direction of the document a portion is reflected after Fresnel reflection on the fiber-air interface of the first end face and passed to the detection system via the fibers. Both these contributions result in a disturbing signal on the detection system. It has been found that these unwanted reflections throw a quantity of scattered light on the detection system, which quantity is larger than the signal light if no appropriate measures are taken. This is because only a few percent of the light incident via the fiber bundle on the document and being scattered on this document are captured within the numerical aperture of the fiber so that this light is passed to the detection system. The light incident on the detection system and originating from the document is thus only a very small portion of the total quantity of light emitted by the light source.

SUMMARY OF THE INVENTION

It is one of the objects of the invention to improve the ratio between disturbing light and light coming from the document in favor of the latter. It is also an object of the invention to improve the coupling of light in the fiber bundle.

To this end the device according to the invention is characterized in that the second end face is provided with an optical system for substantially eliminating the transmission of light from the light source to the detection system other than via the document to be scanned.

The use of such a system will reduce the quantity of disturbing light because more light is coupled in the fiber bundle so that ultimately a better signal-to-noise ratio on the radiation-sensitive surface of the detection system is realised.

An embodiment of the device according to the invention is characterized in that the optical system comprises a transparent plate provided on the second end face, which plate is made of a material whose refractive index substantially corresponds to the refractive index of the core material of the fibers, and in that one side of the plate facing the light source has an anti-reflection coating. Due to the equal refractive index of the plate and the fiber cores, there is no direct Fresnel reflection on the second end face. Reflections on the surface of the plate remote from the second end face are largely prevented by the anti-reflection coating provided thereon.

Another embodiment of the device according to the invention is characterized in that the optical system comprises a light guide arranged between the light source and the second end face. The transition of the light to the material of the light guide results in the light beam emitted by the light source being bundled due to refraction. Due to total internal reflection, the wall of the light guide provides a satisfactory conductance of the light to the second end face and simultaneously provides a homogeneous distribution of light. If the light source is annular and substantially surrounds the axis of the beam, the light guide has a conical shape. Similarly as in the previous embodiment, the light guide is preferably made of a material having approximately the same refractive index as the core material of the fibers.

This embodiment may be further characterized in that the light guide has a central portion remote from the second end face, which portion comprises a refractive face functioning as a lens for imaging the second end face on the detection system. By forming the exit face as a lens, a separate lens can be dispensed with and hence loss of light due to reflection on the entrance and exit faces of such a lens is reduced.

A further characteristic of this embodiment is that the central portion of the light guide is surrounded by a sleeve which does not transmit light. The sleeve shields the light path between the exit face of the light guide and the detection system from laterally entering disturbing light.

A further embodiment is characterized in that the optical system comprises a splitting cube which is arranged in the light path between the light source and the second end face, said splitting cube having an entrance or exit face extending at a substantially right angle to the second end face, and a side face located opposite said entrance or exit face, which side face and entrance or exit face extend at an acute angle $\alpha$ to each other. In this embodiment the light beam incident in the second end face and the emerging beam are not separated from each other by the oblique incidence of the first-mentioned beam, but by a semi-transparent mirror in the splitting cube. The semi-transparent mirror splits the light beam generated by the light source into a sub-beam which is incident on the second end face and into a sub-beam which is directed towards one of the side faces. After reflection on the side face, a portion of the latter beam is reflected and thus supplies a disturbing signal on the detection system. By giving the side face an oblique position, the value of the disturbing signal can be reduced to far below the level of the signal originating from the document.

This embodiment is preferably characterized in that the said angle α is approximately 30°. It has been found that a divergence of 20° of the incident light beam and an angle of obliqueness of approximately 30° yields the minimum possible disturbing signal.

A further characteristic of this embodiment is that the optical system also comprises a light guide for transmitting light from the light source to an entrance face of the splitting cube. A uniform distribution of the light at the exit is obtained by means of the light guide, while light falling within the numerical aperture of the fibers in the fiber bundle and light falling outside it is also filtered. The light falling outside the numerical aperture emerges from the light guide before it reaches the splitting cube and consequently it cannot contribute to the disturbing signal via reflections.

The embodiments mentioned hereinbefore may be further characterized in that the optical system is connected to the second end face of the fiber bundle by means of a material whose refractive index is substantially equal to the refractive index of the core material of the optical fibers. By using an adhesive whose refractive index after curing is substantially equal to the refractive index of the fiber cores it is not necessary to polish the fibers and the second end face. Unevennesses are filled up by the adhesive. A suitable adhesive is, for example, a resin which is curable under the influence of UV light or heat.

The splitting cube and the light guide are preferably also at least partly made of a material which has substantially the same refractive index as that of the fiber cores. As already noted hereinbefore, this prevents scattering and Fresnel reflections on the faces of the elements. If the fibers are so-called "graded-index" fibers, in which the cores have a gradient in their refractive index, the refractive index of the splitting cube and the light guide should not be too far outside the region of the refractive indices of the core material.

The device according to the invention may be further characterized in that the first end face has a normal which extends at an angle φ to the direction of the axis of the optical fibers in the fiber bundle. Since the end face is oblique with respect to the fibers, a part of the light reflected on said end face is reflected outside the numerical aperture of the fiber. As a result the reflected light partly leaves the fiber via the cladding already after a short distance and is thus not passed towards the detection system.

An embodiment is further characterized in that the optical fibers have a numerical aperture of approximately 0.5, in that said angle φ is approximately 22° and in that the first end face of the fiber bundle is provided with a transparent plate. By using the transparent plate in conjunction with the oblique position, a part of the light reflected on the first end face is reflected outside the core of the fibers. The plate is preferably made of a material having a refractive index which is substantially equal to the refractive index of the core material. Also the adhesive with which the plate and the fibers are joined preferably has substantially the same refractive index.

Another embodiment is characterized in that the transparent plate is made of a material whose refractive index is smaller than the refractive index of the core material of the fibres. In this case the total Fresnel reflection on both surfaces of the plate is smaller than in the case of the same refractive index for the plate and the fiber cores. To prevent reflections, the plate may alternatively be provided with an anti-reflection coating.

A special embodiment is characterized in that the light source is adapted to emit light having different wavelengths within the wavelength range which is visible to the human eye, and in that the detection system is composed of color-sensitive elements.

This device provides the possibility of scanning documents on which colors occur and of filing or transmitting them electronically.

This special embodiment is further characterized in that the detection system comprises a light-sensitive CCD and a color filter matrix arranged in front of it. Such a CCD is known per se for use in color video cameras. For use in an optical scanning device according to the invention, this embodiment is further characterized in that the CCD and the color filter matrix are composed of elements whose surface is considerably smaller than the cross-section of the images of the fiber ends in the fiber bundle on the detection system. As a result of the light from each fibre in the optical fibre bundle is incident on a number of elements of the color filter matrix so that the color of the light emerging from each fibre can be separately determined for each fibre.

A plurality of light-emitting diodes emitting light of different wavelengths can be used as a light source. Another embodiment of the device according to the invention is, however, characterized in that the light source is a halogen lamp with a blue filter arranged in front of it. This combination yields an efficient and compact light source having a uniform intensity through the visual part of the electromagnetic spectrum.

These afore-described and other, more detailed aspects of the invention will be described in greater detail with reference to the following description and drawings of some embodiments.

BRIEF DESCRIPTION OF THE DRAWINGS

The invention will be further described with reference to the drawings in which.

DETAILED DESCRIPTION OF THE PREFERRED EMBODIMENTS

Figure 1:
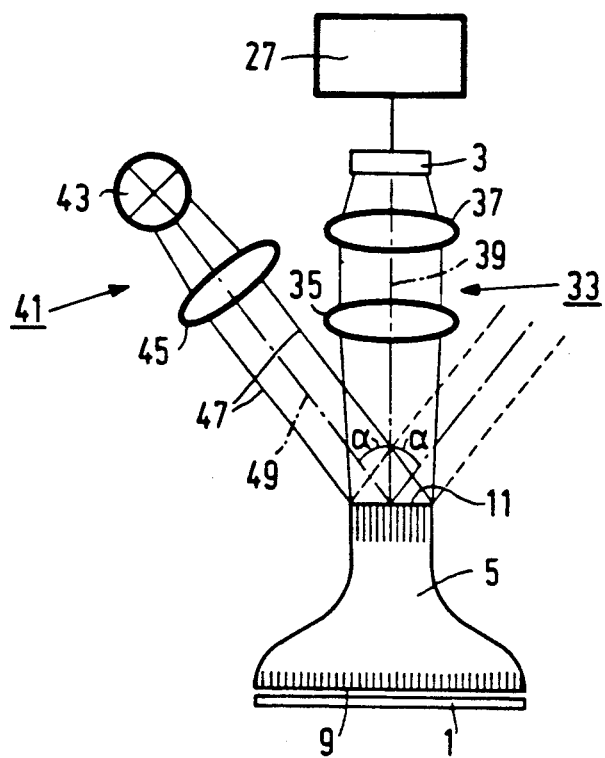
FIG. 1 shows a known device for scanning documents.

FIG. 1 shows diagrammatically a device for scanning a document 1. The document, for example, a sheet of A4 format paper is moved by a transport system (not shown) under an optical scanner in a direction perpendicular to the plane of the drawing. The scanning device comprises a bundle of optical fibers 5, a light source 41 comprising a lamp 43 and a condensor lens 45, a detection system 3 and an imaging system 33. The exit of the detection system 3 is connected to a signal processing unit 27 which converts the output signals of the detection system into signals which are suitable for transmission and/or storage. The imaging system 33 comprises, for example, two lenses 35 and 37.

While a document 1 is being scanned, the second end face 11 of the fiber bundle 5 is irradiated with a light beam 47 which is generated in the lamp 43. A part of this light is passed through this fiber to the first end face 9, emerges from this face and thus illuminates the part of the document which is directly lying under this end face. The light scattered on the document is subsequently partly captured again in the fibers and passed to the second end face 11. This end face is imaged on the detection system 3 via the lens system 33.

The fibers in the fiber bundle are arranged along a line at the document side so that the fiber ends cover the full width of the face to be scanned. For a current facsimile apparatus (group 3 in accordance with CCITT standards) an A4 document having a width of 216 mm is to be scanned with 8 dots per mm. The total number of fibers is thus 1728. The fibers are arranged, for example, in a rectangle of 36×48 fibers at the second end face (11), the detector side. This rectangle is imaged on a sensor element 3 via the imaging system, for example, a CCD element having an aspect ratio of 3:4. For example, a sensor element for a video camera may be used as a detection system. These elements are commercially available.

The fiber bundle is made of, for example, fibers having a core of polymethyl methacrylate (PMMA) having a refractive index of 1.495. The core is surrounded by a cladding with a refractive index of approximately 1.41. The numerical aperture of such fibers is approximately 0.5. Such fibers are marketed, for example, by the firm of Mitsubishi Rayon Co under the name of ESKA ®.

In the device described hereinbefore the light which is incident on the second end face and which is not captured by the fibers is largely reflected. Without appropriate measures a part of this reflected light will be captured by the lens system 33 and reach the detection system 3, or it will reach other elements on this system via reflection. Of the light which is passed through the fibers to the first end face, approximately 5% is reflected due to Fresnel reflection on said face. Due to the scattering effect of the document paper and the limited capturing angle of the fibers only a few percent of the light incident on the document is captured by the fibers. As a result of all these unwanted reflections, the signal light reflected by the document will be less than half the light incident on the detection system, if no measures are taken to prevent these unwanted reflections.

Figure 2:
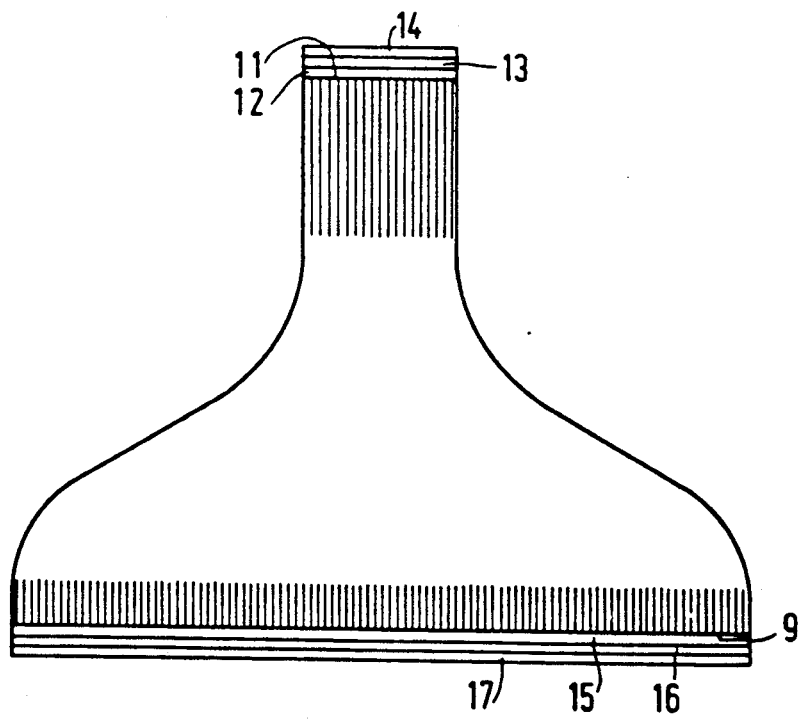
FIG. 2 shows a fiber bundle for use in such a device in which the two end faces are provided with a transparent plate for reducing disturbing reflections on these end faces.

FIG. 2 shows a first example of measures with which the unwanted light reflections can be inhibited while simultaneously increasing the intensity of the signal light. The second end face 11 of the fiber bundle 5 is provided with a plane-parallel transparent plate 13. This plate may be made of, for example, the same material as the optical fibers. The plate is secured to the second end face by means of an adhesive 12 curing under the influence of UV light or heat. Preferably this adhesive has a refractive index, after curing, which is equal to the refractive index of the fiber cores. It is then not necessary to accurately polish the second end face because the unevennesses are filled up with this adhesive. The side of the transparent plate 13 remote from the second end face has an anti-reflection coating 14 which is composed of, for example, a plurality of thin layers each having a different refractive index.

The first end face of the fiber bundle is also provided with a transparent plate 16 which is secured to this face by means of a layer 15 of an adhesive curing under the influence of UV light or heat. Similarly as for the second end face, this layer 15 preferably has a refractive index which is substantially equal to the refractive index of the core material of the fibers. Here again the adhesive fills up the unevenesses.

The plate 16 is not only used to reduce reflections but also to protect the fiber ends. This plate is thus preferably made of a wear-resistant material such as glass. The optimum thickness of the glass plate is dependent on the optimum optical distance between the fiber ends and the document and on the required geometrical distance between the plate and the document. For a practical embodiment using 8 fibers per mm, a numerical aperture of 0.5 and a refractive index of the transparent material of 1.5, the plate should have a thickness of approximately 45 $\mu$m.

For a further reduction of the reflection it is, for example, possible to manufacture the plate of a material having a refractive index which is between the refractive indices of the core material of the fibers and the refractive index of air.

The reflection of radiation from the fibers on the transparent plate 16 can also be inhibited by providing the surface of the plate with an anti-reflection coating 17 which is composed of, for example several thin layers having different refractive indices.

However, the said anti-reflection measures do not provide a sufficient wear resistance for all possible applications. For this reason it is preferred to give the transparent plate an oblique position with respect to the axis of the fibers in the bundle. It is not the quantity of reflected light which is reduced hereby but the quantity of light which is reflected such that it can propagate back into the fiber and may disturb the signal on the detection system.

Figure 3:
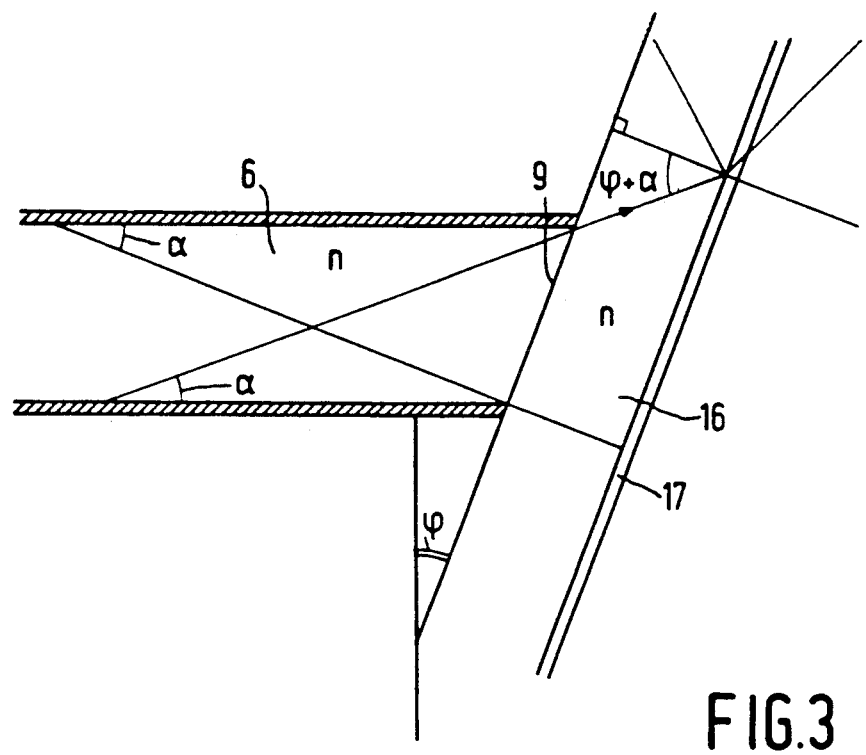
FIG. 3 illustrates a reduction of reflection on the first end face by means of an obliquely positioned plate.

FIG. 3 shows the end of a fiber whose end face is optically coupled to a transparent plate 16. The normal of the transparent plate extends at an angle $\phi$ to the axis of the fiber. If the fiber core comprises a material having a refractive index n of 1.5, for example, PMMA, the maximum angle $\alpha$ at which light propagating through the fiber extends to the axis of the fiber is approximately 20°. In order to prevent total internal reflection on the surface of the transparent plate with air and thus loss of light on the document, the angle $\phi+\alpha$ should be preferably smaller or not much larger than the arcsin (1/n). with n=1.5, $\phi$ may thus be approximately 22° at a maximum. In order to cause as much as possible light reflecting on the plate-air surface to reflect outside the numerical aperture of the fiber 6, $\phi$ must be larger than $\alpha$. In the above-mentioned example the optimum value of $\phi$ is approximately 22°.

Figure 4:
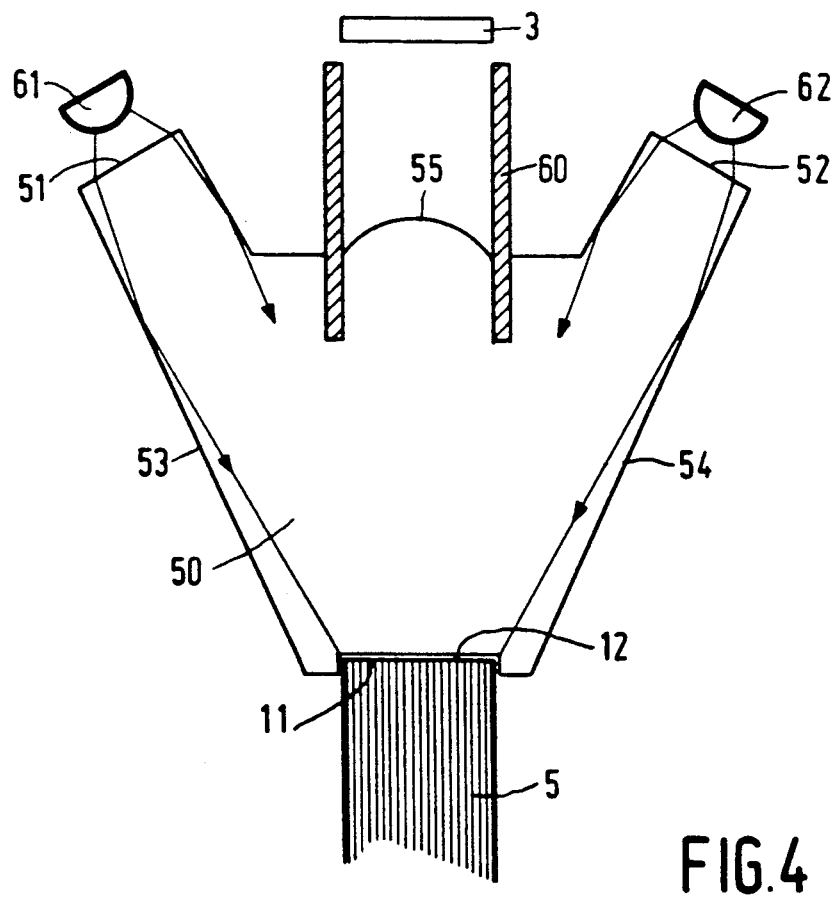
FIG. 4 shows a light guide with which unwanted reflections in the second end face are prevented.

FIG. 4 shows an embodiment for coupling in and out light in the second end face of the fiber bundle facing the light source and the detection system. In this Figure elements also shown in one of the previous Figures have the same reference numerals. A light-conducting element 50 is secured to the second end face 11 of the fiber bundle 5, for example, with an intermediate adhesive layer 12. The element 50 is made of, for example, PMMA or another material having a refractive index which is approximately equal to that of the fiber cores. The element 50 is wedge or cone-shaped and has light entrance faces 51 and 52. Light sources, for example, LEDs 61 and 62 are arranged outside these entrance faces and generate and emit light with which the end face 11 is irradiated. Since the divergence of the beam generated by the LEDs 61 and 62 is reduced due to refraction on the entrance faces 51 and 52, and since the side faces 53 and 54 of the element 50 reflect the light, a considerably larger quantity of the emitted light reaches the end face 11 as compared with the case where the element 50 is absent.

The element 50 has also a spherical face 55 which is located opposite the end face 11 of the fiber bundles. This face 55 functions as a lens with which an image of the end face on the detection system 3 is formed. This image may represent the end face both in an enlarged and a reduced form so that the size of the image can be adapted to the size of the detection system 3 by means of this lens. A more complex imaging system of which the face 55 forms part may be used instead of a single refractive face 55.

To prevent disturbing light directly from the light sources 61 and 62 on the detection system, the light path between the end face 11 and the detection system 3 may be partly shielded by a sleeve 60. Preferably this sleeve has a light-absorbing, for example, dull black surface so that hardly any reflections can occur.

When using two light sources, the element 50 may be in the form of a flat wedge-shaped element having a constant thickness. If a larger number of light sources is used, the element 50 may be rotationally symmetrical and thus be conical or it may have a plurality of wings secured to each other in a star configuration.

A scanning device comprising a light guide such as the element 50 is eminently suitable for observing not only the contrast of the document but also colors which may be present on the document. To this end LEDs which emit light in a different wavelength range are arranged in front of the entrance faces (51, 52) so that the document is illuminated with light comprising a large part of the visual spectrum. In addition to a light source generating light throughout the visible spectrum, a detection system is required with which the entire spectrum can be observed and analysed. CCD sensors which are suitable for this purpose are marketed by N. V. Philips Gloeilampenfabrieken of the Netherlands under type numbers NXA 1021 and NXA 1041. These sensors incorporate a color filter matrix for the actual radiation-sensitive surface so that each light-sensitive element in the detection system is sensitive to one wavelength range only.

The illumination may not only be effected by means of a plurality of light-emitting diodes but also by means of a single lamp, for example, a halogen lamp. To irradiate an annular entrance face of the light guide by means of this lamp, for example an optical system may be used which comprises a rotationally symmetrical concave mirror with an elliptic shape as generation, while the axis of the ellipse extends at an angle to the symmetry axis of the system and the point of intersection of the symmetry axis and the axis of the ellipse coincides with one of the foci of the ellipse. Such a system is known per se from EP-A 0,168,105.

Figure 5:
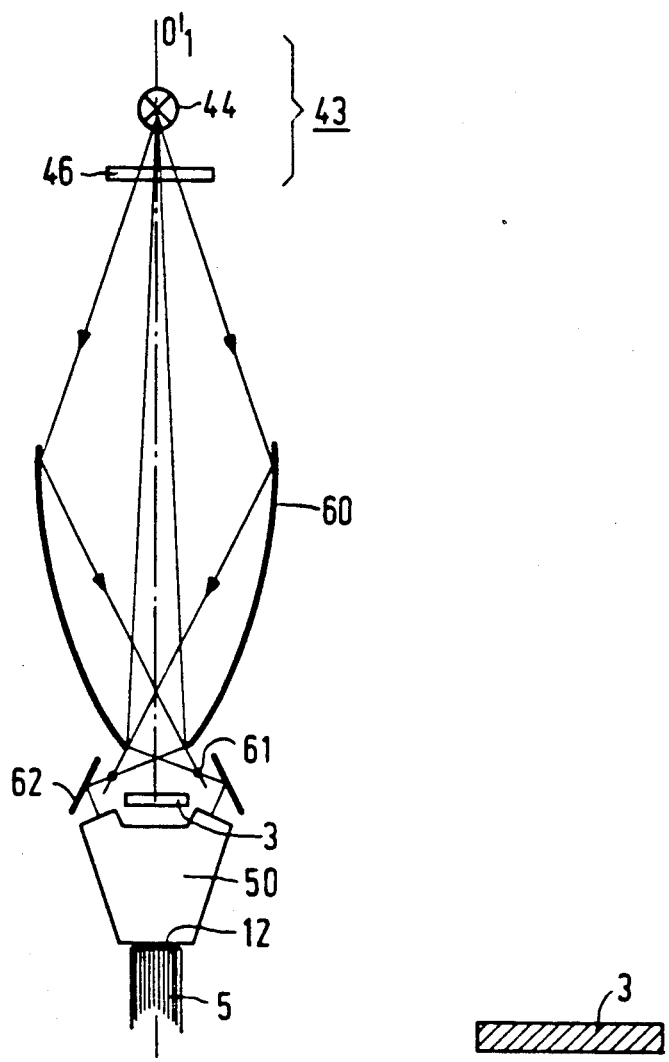
FIG. 5 shows an optical system for use of a single light source for illuminating an annular entrance face.

FIG. 5 shows a possible embodiment of this system. The halogen lamp 44, or an image thereof, is placed on the optical axis of the system. Light emitted by the lamp 44 is incident on the concave mirror 60 of the shape described hereinbefore. Since light which is emitted in a focus of an ellipse is reflected by the ellipse in the other focus, the light reflected by the mirror 60 is concentrated in a ring 61. This ring 61 is on or near the entrance face of the element 50. If desired, a mirror 62 may be arranged between the mirror 60 and the element 50 so as to reflect the light, if necessary, already in the direction of the second end face of the fiber bundle.

To adapt the color of the light beam to the sensitivity of the CCD sensor, a filter, for example, a blue filter 46 may be arranged in front of the halogen lamp.

Figure 6:
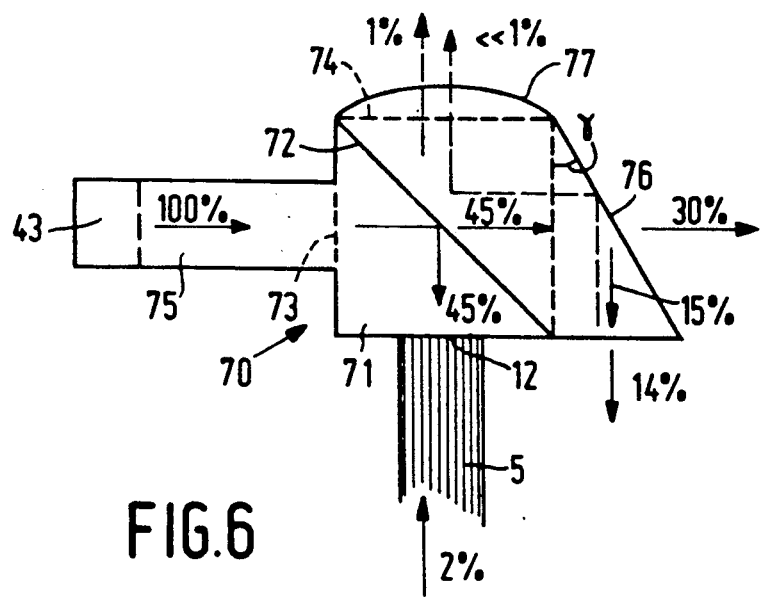
FIG. 6 shows a splitting cube having an oblique side face for preventing reflections towards the detection system.

FIG. 6 shows another embodiment for coupling in and out light in the second end face 11 of the fiber bundle 5. A splitting cube 70 comprising a transparent cube-shaped body 71 accommodating a semi-transparent mirror 72 is arranged on the second end face. The splitting cube has an entrance face 73 and an exit face 74. In the Figure and in the following description the exit face 74 is assumed to be perpendicular to the axis of the fiber bundle 5 and the entrance face 73 parallel to this axis. However, this may also be the other way around.

Light from a lamp 43 is passed to the entrance face 73 via a light guide 75. The light guide 75 has two functions. Since the light in the light guide is reflected by means of total internal reflection (TIR), the light guide only conducts light whose direction of propagation extends at an angle to the light guide axis which is less than the critical angle for TIR. By choosing this angle to be equal for the angle within which light is passed through the optical fibers, the light guide filters out the unwanted light before it reaches the splitting cube. Moreover, due to the repeated reflections of light on the walls of the light guide, the intensity distribution on the entrance face 73 of the splitting cube 70 is uniform, even when the intensity distribution of the light entering the light guide 75 is not uniform.

As is shown in the Figure, approximately half of the light entering the splitting cube is reflected by the entrance face 73 to the fiber bundle 5 via the semi-transparent mirror 72. The other half passes the semi-transparent mirror and is partly reflected on the side face 76 facing the entrance face. If this side face 76 were perpendicular to the incident light beam, an unnegligible fraction would be reflected and would partly reach the detection system via the semi-transparent mirror.

By giving the side face 76 an oblique position, light incident on this side face is not directly reflected to the semi-transparent mirror but to other side faces of the splitting cube so that this light can only be incident on the detection system after repeated reflections. A large part of the light emerges from the splitting cube at each of these reflections so that the part which is ultimately incident on the detection system is reduced to a fraction of one percent of the entering light and is thus much weaker than the signal from the document.

When using PMMA as a transparent material, the maximum angle at which light propagates in the light guide is approximately 20°. It has been found that the obliqueness angle $\alpha$ should be approximately 30° so as to cause a minimum quantity of disturbing light from this source to be incident on the detection system.

Similarly as in the previously described optical system, the splitting cube 70 has a curved refractive face 77 which is used as (part of) an imaging system for imaging the second end face 12 on the detection system 3.

We claim:

1. A device for optically scanning a document, which device comprises a light source for illuminating the document to be scanned, an optical detection system and an optical fiber bundle for transmitting light from the light source to the document and for transmitting light from the document to the detection system, said fiber bundle comprising a plurality of optical fibers having a core and a cladding and each having a first and a second end, said first ends being arranged substantially along a line in a first end face of the fiber bundle and said second ends being arranged in a second end face, the second end face facing the light source and the detection system, characterized in that a transparent plate is provided on the second end face, which plate is made of a material whose refractive index substantially corresponds to the refractive index of the core material of the fibers, and in that one side of the plate facing the light source has an anti-reflection coating for substantially eliminating the transmission of light from the light source to the detection system other than via the document to be scanned.

2. A device as claimed in claim 1, characterized in that the optical system is at least partly made of a material having a refractive index which is substantially equal to the refractive index of the core material of the optical fibers.

3. A device as claimed in claim 1, characterized in that the light source (43) is a halogen lamp (44) with a filter (46) arranged in front of it.

4. A device as claimed in claim 1, characterized in that the optical system is connected to the second end face (11) of the fiber bundle by means of a material (12) whose refractive index is substantially equal to the refractive index of the core material of the optical fibers.

5. A device as claimed in claim 4, characterized in that the said connection material is an adhesive curing under the influence of UV light.

6. A device as claimed in claim 4, characterized in that the said connection material is an adhesive curing under the influence of heat.

7. A device as claimed in claim 1, characterized in that the first end face has a normal which extends at an angle $\phi$ to the direction of the axis of the optical fibers in the fiber bundle.

8. A device as claimed in claim 7, characterized in that the optical fibers have a numerical aperture of approximately 0.5, in that said angle $\phi$ is approximately 22° and in that the first end face (9) of the fiber bundle is provided with a transparent plate (16).

9. A device as claimed in claim 4, characterized in that the transparent plate (16) is secured by means of a material whose refractive index is substantially equal to the refractive index of the core material of the optical fibers.

10. A device as claimed in claim 8, characterized in that the transparent plate is made of a material whose refractive index is smaller than the refractive index of the core material of the fibers.

11. A device as claimed in claim 8, characterized in that the transparent plate has an anti-reflection coating (17) at the side remote from the first end face (9).

12. A device as claimed in claim 1, characterized in that the light source is adapted to emit light having different wavelengths within the wavelength range which is visible to the human eye, and in that the detection system is composed of color-sensitive elements.

13. A device as claimed in claim 12, characterized in that the detection system comprises a light-sensitive CCD and a color filter matrix arranged in front of it.

14. A device as claimed in claim 13, characterized in that the CCD and the color filter matrix are composed of elements whose surface is considerably smaller than the cross-section of the images of the fiber ends in the fiber bundle on the detection system (3).

15. A device for optically scanning a document, which device comprises a light source for illuminating the document to be scanned, an optical detection system and an optical fiber bundle for transmitting light from the light source to the document and for transmitting light from the document to the detection system, said fiber bundle comprising a plurality of optical fibers having a core and a cladding and each having a first and a second end, said first ends being arranged substantially along a line in a first end face of the fiber bundle and said second ends being arranged in a second end face, the second end face facing the light source and the detection system, characterized in that a light guide is arranged between the light source and the second end face, the light guide having a central portion remote from the second end face, which portion comprises a refractive face functioning as a lens for imaging the second end face on the detection system for substantially eliminating the transmission of light from the light source to the detection system other than via the document to be scanned.

16. A device as claimed in claim 15, characterized in that the central portion of the light guide is surrounded by a sleeve (60) which does not transmit light.

17. A device for optically scanning a document, which device comprises a light source for illuminating the document to be scanned, an optical detection system and an optical fiber bundle for transmitting light from the light source to the document and for transmitting light from the document to the detection system, said fiber bundle comprising a plurality of optical fibers having a core and a cladding and each having a first and a second end, said first ends being arranged substantially along a line in a first end face of the fiber bundle and said second ends being arranged in a second end face, the second end face facing the light source and detection system, characterized in that a splitting cube is arranged in the light path between the light source and the second end face, said splitting cube having an entrance or exit face extending at a substantially right angle to the second end face, and in that the splitting cube has a side face located opposite said entrance or exit face, which side face and entrance or exit face extend at an acute angle to each other.

18. A device as claimed in claim 17, characterized in that the said angle is approximately 30°.

19. A device as claimed in claim 17, characterized in that the optical system also comprises a light guide (75) for transmitting light from the light source (43) to an entrance face (73) of the splitting cube (70).

20. A device as claimed in claim 17, characterized in that the exit face of the splitting cube is provided with a lens for imaging the second end face of the fiber bundle on the detection system.

* * * * *